W. RICE.
STEAM GENERATOR.
No. 26,927. Patented Jan. 24, 1860.
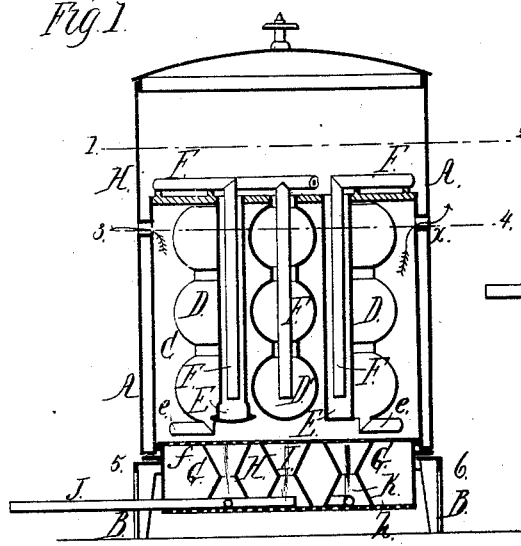
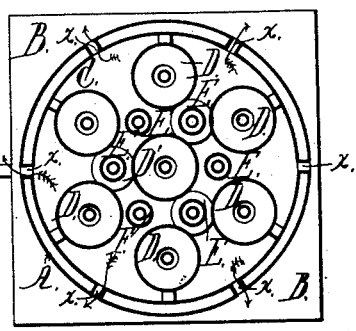
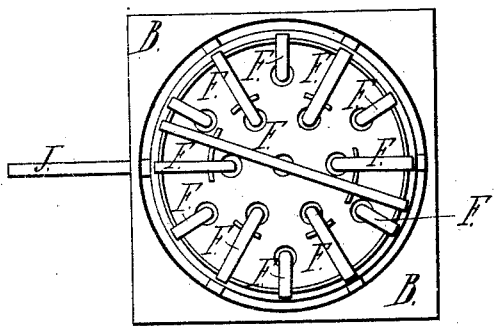
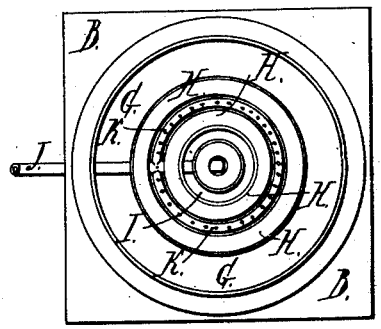
Witnesses:
Henry Howson
Horace See
Inventor:
Wm Rice

UNITED STATES PATENT OFFICE.

WILLIAM RICE, OF PHILADELPHIA, PENNSYLVANIA.

IMPROVED STEAM-GENERATOR.

Specification forming part of Letters Patent No. 26,927, dated January 24, 1860.

*To all whom it may concern:*

Be it known that I, WILLIAM RICE, of the city and county of Philadelphia, and State of Pennsylvania, have invented certain new and useful Improvements in Steam-Generators; and I do hereby declare the following to be a full, clear, and exact description of the same, reference being had to the accompanying drawings, and to the letters of reference marked thereon.

My invention consists in a box covered above and below with perforated or wire-gauze plates and containing an annular double-cone-shaped gas-chamber with an annular perforated gas-pipe and a central double-cone-shaped gas-chamber, the whole being combined with and arranged in respect to the inner and outer casing of the generator and certain vents in the manner described hereinafter, so as to form an apparatus by means of which gas may be economically applied to the generation of steam.

In order to enable others skilled in the art to make and use my invention, I will now proceed to describe its construction and operation.

On reference to the accompanying drawings, which form a part of this specification, Figure 1 is a vertical sectional elevation of my improved steam-generator; Fig. 2, a sectional plan on the line 1 2, Fig. 1; Fig. 3, the same on the line 3 4, Fig. 1; Fig. 4, the same on the line 5 6, Fig. 1; and Figs. 5 and 6 are modified forms of suspended vessels.

Similar letters refer to similar parts throughout the several views.

A is the outer casing of the generator, and C the inner casing, the two casings being connected together at the bottom, where they rest on the base B. To the top of the inner casing are secured a number of vessels D D, arranged in a circle round a vessel D', as seen in Fig. 3, and between the vessels D and the central vessel D' a number of smaller vessels F are arranged in a circle, the whole of these vessels communicating with the space between the top of the inner casing C and outer casing A. At their lower ends the vessels D D communicate through tubes $e$ with the water-space between the inner and outer casing of the generator. The remaining vessels may or may not have such a communication. Within each vessel is inserted a tube F, terminating at the lower end a short distance from the bottom of each vessel and resting at the top on the upper plate of inner casing. The chamber formed by the inner casing C is closed at the lower end by the box G, which rests on the base B, and which is covered at the top by a perforated plate or a plate of wire-gauze $f$ and at the bottom by a similar plate $h$.

Within the box G is an annular chamber H, the vertical section of which, as seen in Fig. 1, is in the form of a double truncated cone. This chamber surrounds a smaller chamber I, which is also made in the form of a double truncated cone.

J is a gas-pipe passing into the box G and communicating with a circular pipe K, which rests on the perforated plate $h$, immediately under the annular chamber H, the pipe being perforated with a number of small holes, through which the gas can escape in the form of jets into the annular chamber H. The same gas-pipe also passes into the chamber I and has a small opening for the escape of gas into that chamber. Water is placed in the generator so as to reach to the level or thereabout indicated by the line 1 2. The gas is then allowed to pass freely through the pipe J and through the perforations into the chambers H and I, so that when a light is applied above the perforated plate $f$ a flame of intense heat will pervade the entire upper surface of that plate and will impart such a heat to the sides and top of the chamber in which the vessels D D and D' and E E are situated, as well as to the vessels themselves, that a rapid generation of steam must take place.

Near the top of the inner casing C are vents $x$, through which the rarefied air passes off from the fire-chamber, a sufficient draft being thus maintained through that chamber. As an intense heat is imparted to the lower ends of the suspended vessels, a very rapid generation of steam takes place within them. Hence the necessity of keeping them constantly supplied with water. This is effected by the internal tube F, which communicates with the water in the space above the inner casing. The water constantly flowing down each pipe takes the place of the steam generated in and ascending through each vessel, in which a constant circulation of water is thus maintained.

I have found by actual experiment that gas-chambers H and I made in the form represented in the drawings are best adapted for the purpose, owing to the inclined sides serving first to contract the supply of air admitted to the chambers and then allowing the air to suddenly expand, thus insuring a thorough mixture of the air with the gas prior to its passing through the perforated plate $f$, and thereby insuring a thorough combustion of the gas. The intimate mixture of the air with the gas is also increased by the perforated plate $h$, through which the air must pass in jets prior to gaining access to the gas-chamber.

I do not desire to claim any of the within-described parts separately and independent of the entire combination; but

I claim as my invention and desire to secure by Letters Patent—

The box G, its perforated wire-gauze plates $f$ and $h$, the annular double-cone-shaped gas-chamber H, its annular perforated gas-tube K, and the double-cone-shaped chamber L, when the whole is combined with and arranged in respect to the inner casing C and outer casing A and vents $x\,x$ of the generator as and for the purpose herein set forth.

In testimony whereof I have signed my name to this specification in the presence of two subscribing witnesses.

WM. RICE.

Witnesses:
 HENRY HOWSON,
 CHARLES D. FREEMAN.